(12) United States Patent
Chen et al.

(10) Patent No.: US 11,290,008 B2
(45) Date of Patent: Mar. 29, 2022

(54) RESONANT SWITCHED-CAPACITOR CONVERTER

(71) Applicant: MediaTek Singapore Pte. Ltd., Singapore (SG)

(72) Inventors: Alex Jianzhong Chen, San Jose, CA (US); Yung-Chih Yen, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 16 days.

(21) Appl. No.: 16/828,923

(22) Filed: Mar. 24, 2020

(65) Prior Publication Data

US 2020/0313550 A1 Oct. 1, 2020

Related U.S. Application Data

(60) Provisional application No. 62/825,860, filed on Mar. 29, 2019.

(51) Int. Cl.
*H02M 3/07* (2006.01)
*H02M 3/00* (2006.01)

(52) U.S. Cl.
CPC ............... *H02M 3/07* (2013.01); *H02M 3/01* (2021.05)

(58) Field of Classification Search
CPC ......... H02M 3/01; H02M 3/07; H02M 7/4815
See application file for complete search history.

(56) References Cited

U.S. PATENT DOCUMENTS

| 9,917,517 | B1 | 3/2018 | Jiang | |
| 9,966,842 | B1* | 5/2018 | Jiang | H02J 1/102 |
| 10,193,441 | B2 | 1/2019 | Giuliano | |
| 10,224,803 | B1* | 3/2019 | Rainer | H02M 3/158 |
| 10,439,493 | B1* | 10/2019 | Zafarana | H02M 1/088 |
| 10,651,731 | B1* | 5/2020 | Rainer | H02M 3/1588 |
| 2015/0015325 | A1* | 1/2015 | Williams | H02M 3/337 |
| | | | | 327/536 |
| 2020/0153347 | A1* | 5/2020 | Li | H02M 3/33569 |

FOREIGN PATENT DOCUMENTS

| CN | 103166467 B | 10/2015 |
| CN | 106921298 A | 7/2017 |
| CN | 105191097 B | 12/2017 |
| TW | 201324071 A1 | 6/2013 |

\* cited by examiner

*Primary Examiner* — Alex Torres-Rivera
(74) *Attorney, Agent, or Firm* — Winston Hsu

(57) ABSTRACT

A resonant switched-capacitor converter is provided. The resonant switched-capacitor is configured to convert an input voltage on an input terminal of the resonant switched-capacitor converter into an output voltage on an output terminal of the resonant switched-capacitor converter. The resonant switched-capacitor converter includes a first resonant tank, a second resonant tank, a non-resonant capacitor, and a connection control circuit coupled to the input terminal, the output terminal, the first resonant tank, the second resonant tank and the non-resonant capacitor. The connection control circuit is configured to control connections of the first resonant tank, the second resonant tank and the non-resonant capacitor.

18 Claims, 8 Drawing Sheets

RESONANT SWITCHED-CAPACITOR CONVERTER

CROSS REFERENCE TO RELATED APPLICATIONS

This application claims the benefit of U.S. provisional application No. 62/825,860, which was filed on Mar. 29, 2019, and is included herein by reference.

BACKGROUND

The present invention is related to power converters, and more particularly, to a resonant switched-capacitor converter.

For a purpose of converting a first direct current (DC) voltage adopted in global power bus into a second DC voltage adopted in local systems, a DC-to-DC power converter is required. For example, in an application of a data center, energy usage may be continuously growing (e.g. with an annual growth greater than 6 percent), which may be exponentially driven by cloud and big data, so saving a fraction of this energy is substantial.

In another example, an automotive power system requires a DC-to-DC power converter in order to convert a 48 Volt (V) voltage into a 12 V voltage for usage of battery power of lights, seats, windows, engine accessories and infotainment. In yet another example, networking and telecommunications infrastructure equipment may have the requirement of power conversion from 48 V to an intermediate bus voltage of 12 V.

In a related art, a transformer-based architecture may be utilized to implement the above power converters. Transformers cost a large area or volume in an apparatus, however. Thus, there is a need for a novel power converter, to improve overall performance such as power density, power efficiency and output power without introducing any side effect or in a way that is less likely to introduce side effects.

SUMMARY

This in mind, an objective of the present invention is to provide a resonant switched-capacitor converter, which improves overall performance in comparison with the related art.

At least one embodiment of the present invention provides a resonant switched-capacitor converter, which is configured to convert an input voltage on an input terminal of the resonant switched-capacitor converter into an output voltage on an output terminal of the resonant switched-capacitor converter. The resonant switched-capacitor converter comprises a first resonant tank, a second resonant tank, at least one non-resonant capacitor, and a connection control circuit coupled to the input terminal, the output terminal, the first resonant tank, the second resonant tank and the at least one non-resonant capacitor. The connection control circuit is configured to control connections of the first resonant tank, the second resonant tank and the at least one non-resonant capacitor. For example, during a first phase, a first terminal of the first resonant tank is coupled to a reference terminal via a path without any capacitor, and a first terminal of the second resonant tank is coupled to the output terminal; and during a second phase, the first terminal of the first resonant tank is coupled to the output terminal, and the first terminal of the second resonant tank is coupled to the reference terminal via a path without any capacitor.

At least one embodiment of the present invention provides a resonant switched-capacitor converter, which is configured to convert an input voltage on an input terminal of the resonant switched-capacitor converter into an output voltage on an output terminal of the resonant switched-capacitor converter. The resonant switched-capacitor converter comprises a first resonant tank, a second resonant tank, at least one non-resonant capacitor, and a connection control circuit coupled to the input terminal, the output terminal, the first resonant tank, the second resonant tank and the at least one non-resonant capacitor. The connection control circuit is configured to control connections of the first resonant tank, the second resonant tank and the at least one non-resonant capacitor. For example, the connection control circuit utilizes a first set of switches within the connection control circuit to control a first terminal of the first resonant tank to be coupled to whether a reference terminal or the output terminal, and utilize a second set of switches within the connection control circuit to control a first terminal of the second resonant tank to be coupled to whether the reference terminal or the output terminal, wherein the first set of switches are different from the second set of switches.

At least one embodiment of the present invention provides a resonant switched-capacitor converter, which is configured to convert an input voltage on an input terminal of the resonant switched-capacitor converter into an output voltage on an output terminal of the resonant switched-capacitor converter. The resonant switched-capacitor converter comprises a first resonant tank, a second resonant tank, at least one non-resonant capacitor, and a connection control circuit coupled to the input terminal, the output terminal, the first resonant tank, the second resonant tank and the at least one non-resonant capacitor. The connection control circuit is configured to control connections of the first resonant tank, the second resonant tank and the at least one non-resonant capacitor. For example, during a first phase, a second terminal of the first resonant tank is coupled to the output terminal, and a second terminal of the second resonant tank is coupled to a first terminal of the non-resonant capacitor; and during a second phase, the second terminal of the first resonant tank is coupled to a second terminal of the non-resonant capacitor, and the second terminal of the second resonant tank is coupled to the output terminal.

Embodiments of the present invention provide a transformer-free architecture to implement a switched-capacitor converter. In addition, overall performance of the switched-capacitor converter such as power density, power efficiency and output power can be improved without greatly increasing additional costs. Thus, the present invention can improve the overall performance without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
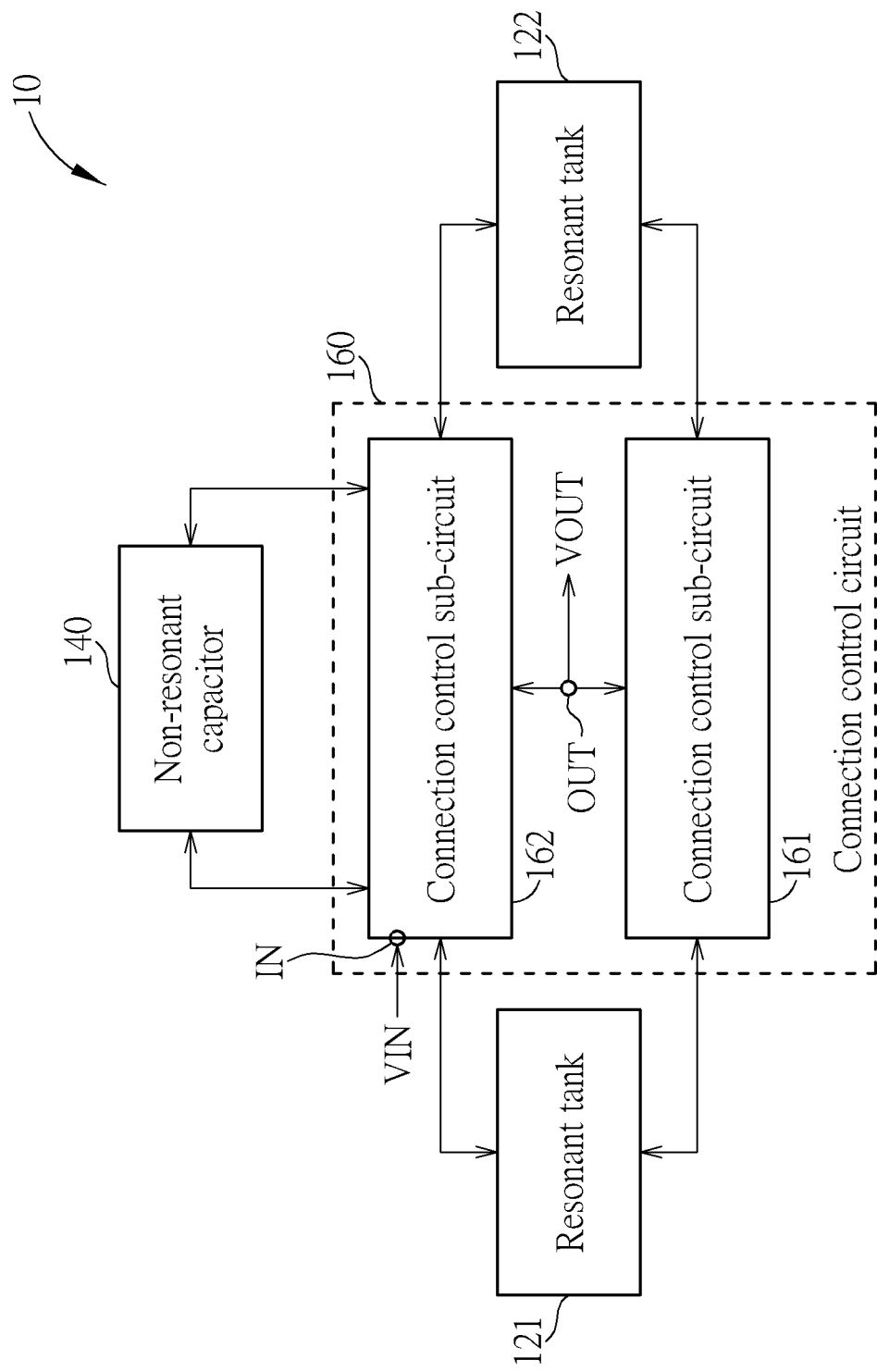
FIG. 1 is a diagram illustrating a resonant switched-capacitor converter according to an embodiment of the present invention.

FIG. 1 is a diagram illustrating a resonant switched-capacitor converter 10 according to an embodiment of the present invention. In this embodiment, the resonant switched-capacitor converter 10 is configured to convert an input voltage VIN on an input terminal IN of the resonant switched-capacitor converter 10 into an output voltage VOUT on an output terminal OUT of the resonant switched-capacitor converter 10. As shown in FIG. 1, the resonant switched-capacitor converter 10 may comprise a first resonant tank such as a resonant tank 121, a second resonant tank such as a resonant tank 122, at least one non-resonant capacitor such as a non-resonant capacitor 140, and a connection control circuit 160, where the connection control circuit 160 is coupled to the input terminal IN, the output terminal OUT, the resonant tank 121, the resonant tank 122 and the non-resonant capacitor 140, and is configured to control connections of the resonant tank 121, the resonant tank 122 and the non-resonant capacitor 140.

For example, the connection control circuit 160 may comprise a connection control sub-circuit 161, but the present invention is not limited thereto. The connection control sub-circuit 161 may be coupled to the output terminal OUT, a first terminal of the resonant tank 121 and a first terminal of the resonant tank 122. The connection control circuit 160 may utilize a first set of switches within the connection control circuit 160 (e.g. the connection control sub-circuit 161 therein) to control the first terminal of the resonant tank 121 to be coupled to whether a reference terminal or the output terminal OUT via a path, and may utilize a second set of switches within the connection control circuit 160 (e.g. the connection control sub-circuit 161 therein) to control the first terminal of the resonant tank 122 to be coupled to whether the reference terminal or the output terminal OUT via a path. The first set of switches are different from the second set of switches. The first set includes switches that are not in the second set. Therefore, there is no switch shared between the path that couples the first terminal of first resonant tank to the reference terminal and the path that couples the first terminal of the second resonant tank to the reference terminal, and/or there is no switch shared between the path that couples the first terminal of first resonant tank to the output terminal OUT and the path that couples the first terminal of the second resonant tank to the output terminal OUT. In one embodiment, during a first phase, the first terminal of the resonant tank 121 is coupled to the reference terminal via a path without any component (e.g. capacitor(s), resistor(s), or any other passive/active device(s)) except switch(s), and the first terminal of the resonant tank 122 is coupled to the output terminal OUT; during a second phase, the first terminal of the resonant tank 121 is coupled to the output terminal OUT, and the first terminal of the resonant tank 122 is coupled to the reference terminal via a path without any component (e.g. capacitor(s), resistor(s), or any other passive/active device(s)) except switch(s); where the reference terminal may be a voltage terminal providing a fixed voltage such as a ground voltage.

In addition, the connection control circuit 160 may further comprise a connection control sub-circuit 162, but the present invention is not limited thereto. The connection control sub-circuit 162 may be coupled to the input terminal IN, the output terminal OUT, a second terminal of the resonant tank 121 and a second terminal of the resonant tank 122. During the first phase, the second terminal of the resonant tank 121 is coupled to the output terminal OUT, and the second terminal of the resonant tank 122 is coupled to a first terminal of the non-resonant capacitor 140; and during the second phase, the second terminal of the resonant tank 121 is coupled to a second terminal of the non-resonant capacitor 140, and the second terminal of the resonant tank 122 is coupled to the output terminal.

In one embodiment, the first terminal of the non-resonant capacitor 140 is coupled to either the second terminal of the resonant tank 122 or the reference terminal, and the second terminal of the non-resonant capacitor 140 is coupled to either the input terminal IN or the second terminal of the resonant tank 121. During the first phase, the first terminal of the non-resonant capacitor 140 is coupled to the second terminal of the resonant tank 122, and the second terminal of the non-resonant capacitor 140 is coupled to the input terminal IN; and during the second phase, the first terminal of the non-resonant capacitor 140 is coupled to the reference terminal, and the second terminal of the non-resonant capacitor 140 is coupled to the second terminal of the resonant tank 121.

Figure 2:
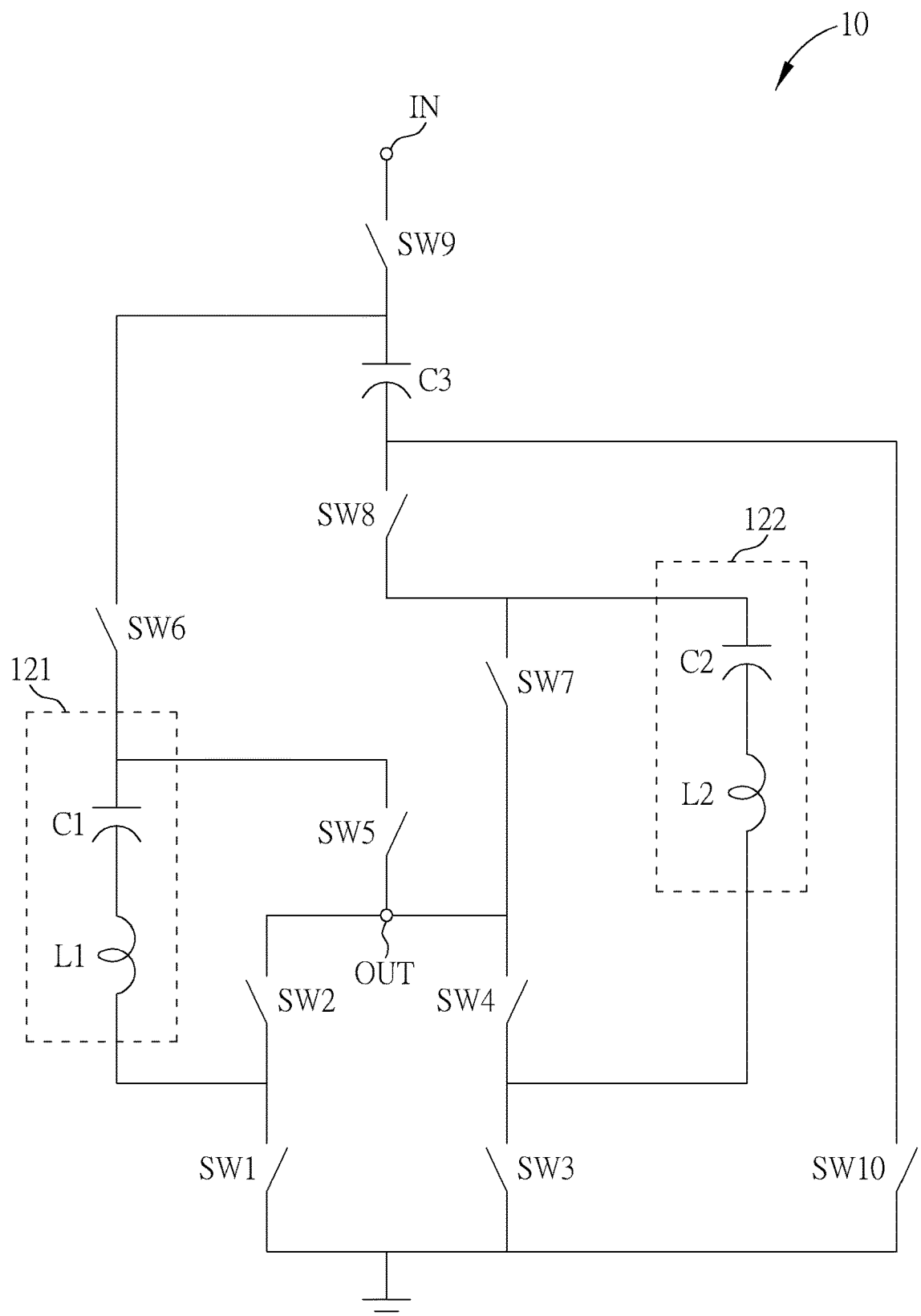
FIG. 2 is a circuit diagram illustrating the resonant switched-capacitor converter shown in FIG. 1 according to an embodiment of the present invention.

FIG. 2 is a circuit diagram illustrating the resonant switched-capacitor converter 10 shown in FIG. 1 according to an embodiment of the present invention. As shown in FIG. 2, the resonant tank 121 may comprise a resonant inductor such as an inductor L1 and a resonant capacitor such as a capacitor C1, and more particularly, the resonant tank 121 may be implemented by the inductor L1 and the capacitor C1 connected in series, where a resonant frequency corresponding to the resonant tank 121 is determined by the inductor L1 and the capacitor C1. In addition, the resonant tank 122 may comprise a resonant inductor such as an inductor L2 and a resonant capacitor such as a capacitor C2, and more particularly, the resonant tank 122 may be implemented by the inductor L2 and the capacitor C2 connected in series, where a resonant frequency corresponding to the resonant tank 122 is determined by the inductor L2 and the capacitor C2. In one embodiment, the inductor L1 may be equivalent with the inductor L2, and the capacitor C1 may be equivalent with the capacitor C2, so the resonant frequency corresponding to the resonant tank 121 is equivalent with the resonant frequency corresponding to the resonant tank 122. In addition, the non-resonant capacitor 140 may comprise a capacitor C3, and more particularly, a capacitance of the capacitor C3 may be much greater than the capacitance of the capacitor C1 or C2, e.g. be ten or more times greater than the capacitance of the capacitor C1 or C2.

In one embodiment, the connection control circuit 160 may comprise a plurality of switches, where a portion of the switches are controlled by a first control signal, and another portion of the switches are controlled by a second control signal. More particularly, the first control signal and the second control signal are non-overlapping control signals. For example, one of the first control signal and the second control signal may have a fifty percent or less duty cycle, and another of the first control signal and the second control signal may have a duty cycle less than fifty percent, but the present invention is not limited thereto. According to some embodiments, one of the first control signal and the second control signal may have a duty cycle less than fifty percent, and another of the first control signal and the second control signal may have a duty cycle less than fifty percent. Preferably, these two duty cycle may be equal to each other.

In detail, the connection control sub-circuit 161 may comprise switches SW1, SW2, SW3 and SW4, where the switch SW1 is coupled between the first terminal of the resonant tank 121 and the reference terminal, the switch SW2 is coupled between the first terminal of the resonant tank 121 and the output terminal OUT, the switch SW3 is coupled between the first terminal of the resonant tank 122 and the reference terminal, and the switch SW4 is coupled between the first terminal of the resonant tank 122 and the output terminal OUT. The switches {SW1, SW2} may be an example of the aforementioned first set of switches within the connection control sub-circuit 161, and the switches {SW3, SW4} may be an example of the aforementioned second set of switches within the connection control sub-circuit 161. The connection control sub-circuit 162 may comprise switches SW5, SW6, SW7, SW8, SW9 and SW10, where the switch SW5 is coupled between the second terminal of the resonant tank 121 and the output terminal OUT, the switch SW6 is coupled between the second terminal of the resonant tank 121 and a second terminal of the capacitor C3, the switch SW7 is coupled between the second terminal of the resonant tank 122 and the output terminal OUT, the switch SW8 is coupled between the second terminal of the resonant tank 122 and a first terminal of the capacitor C3, the switch SW9 is coupled between the input terminal IN and the second terminal of the capacitor C3, and the switch SW10 is coupled between the first terminal of the capacitor C3 and the reference terminal. More particularly, the switches SW1, SW4, SW5, SW8 and SW9 are controlled by the first control signal (e.g. are turned on during the first phase, and are turned off during the second phase), and the switches SW2, SW3, SW6, SW7 and SW10 are controlled by the second control signal (e.g. are turned off during the first phase, and are turned on during the second phase). It should be noted that implementation of the connection control circuit 160 (e.g. the connection control sub-circuit 161 and 162 therein) is for illustrative purposes only, and is not a limitation of the present invention. Any implementation that can control the connections of the resonant tank 121, the resonant tank 122 and the non-resonant capacitor 140 with the manner mentioned above should belong to the scope of the present invention.

Figure 3:
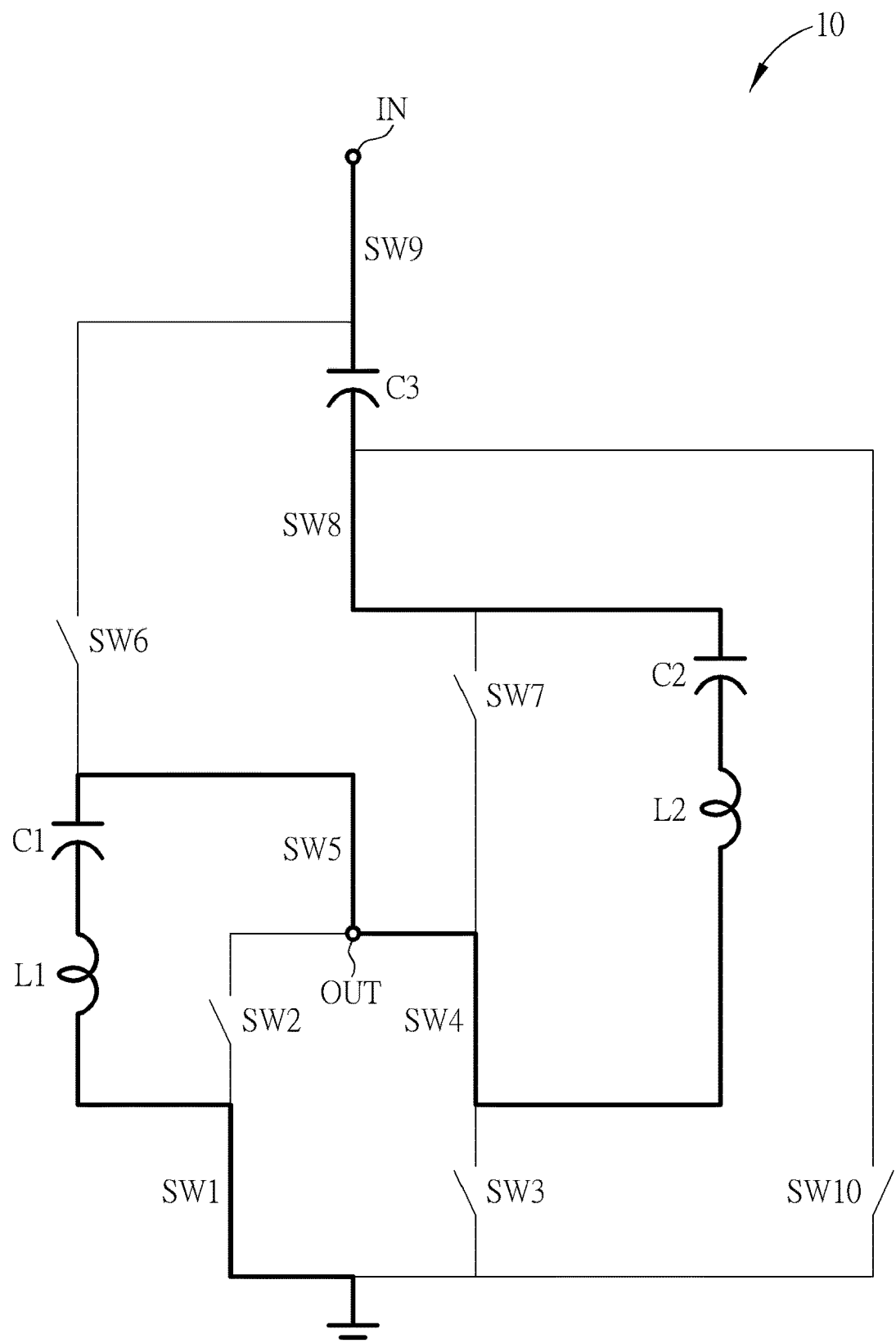
FIG. 3 is a diagram illustrating a first configuration of the resonant switched-capacitor converter shown in FIG. 2 during a first phase according to an embodiment of the present invention.
Figure 4:
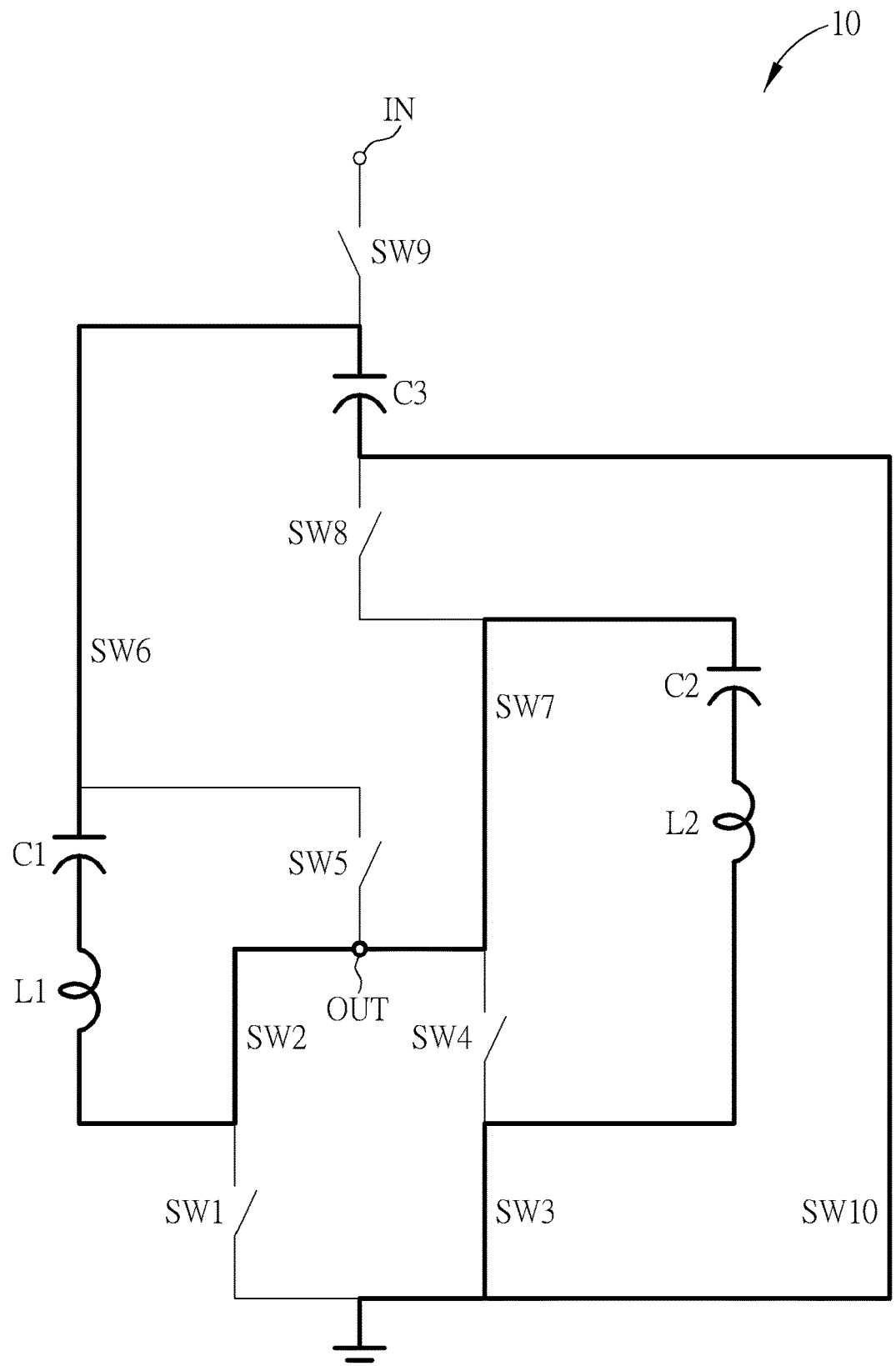
FIG. 4 is a diagram illustrating a second configuration of the resonant switched-capacitor converter shown in FIG. 2 during a second phase according to an embodiment of the present invention.

FIG. 3 is a diagram illustrating a first configuration of the resonant switched-capacitor converter 10 shown in FIG. 2 during the first phase according to an embodiment of the present invention. As the switches SW1, SW4, SW5, SW8 and SW9 are turned on and the switches SW2, SW3, SW6, SW7 and SW10 are turned off during the first phase, the resonant switched-capacitor converter 10 may form the first configuration as illustrated by thick lines shown in FIG. 3. FIG. 4 is a diagram illustrating a second configuration of the resonant switched-capacitor converter 10 shown in FIG. 2 during the second phase according to an embodiment of the present invention. As the switches SW1, SW4, SW5, SW8 and SW9 are turned off and the switches SW2, SW3, SW6, SW7 and SW10 are turned on during the second phase, the resonant switched-capacitor converter 10 may form the second configuration as illustrated by thick lines in FIG. 4.

Figure 5:
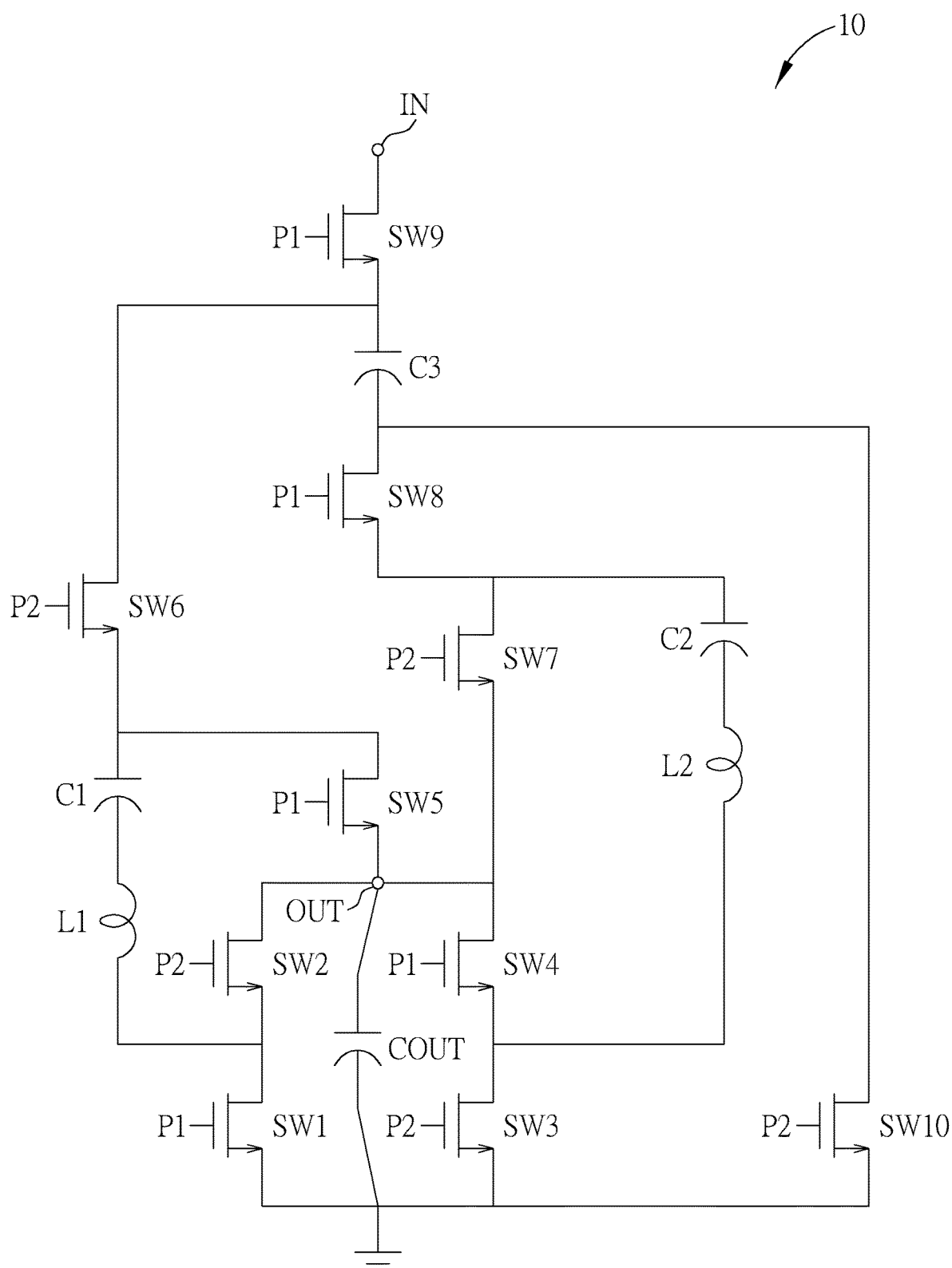
FIG. 5 is a detailed implementation based on the resonant switched-capacitor converter shown in FIG. 2 according to an embodiment of the present invention.

FIG. 5 is a detailed implementation based on the resonant switched-capacitor converter 10 shown in FIG. 2 according to an embodiment of the present invention. As shown in FIG. 5, the output terminal OUT is further coupled to an output capacitor COUT. Each of the switches SW1, SW2, SW3, SW4, SW5, SW6, SW7, SW8, SW9 and SW10 may be implemented by a transistor, e.g. an N-type Metal-Oxide-Semiconductor Field-Effect Transistor (MOSFET), where a gate electrode of each transistor receives a corresponding control signal (e.g. either the first control signal such as a control signal P1 or the second control signal such as a control signal P2). This implementation of a single switch is for illustrative purposes only, and is not a limitation of the present invention. Those skilled in the art should understand detailed operations of transistor(s) acting as switch in this embodiment with aid of the architecture shown in FIG. 5, and therefore, the detailed operations are omitted for brevity.

Figure 6:
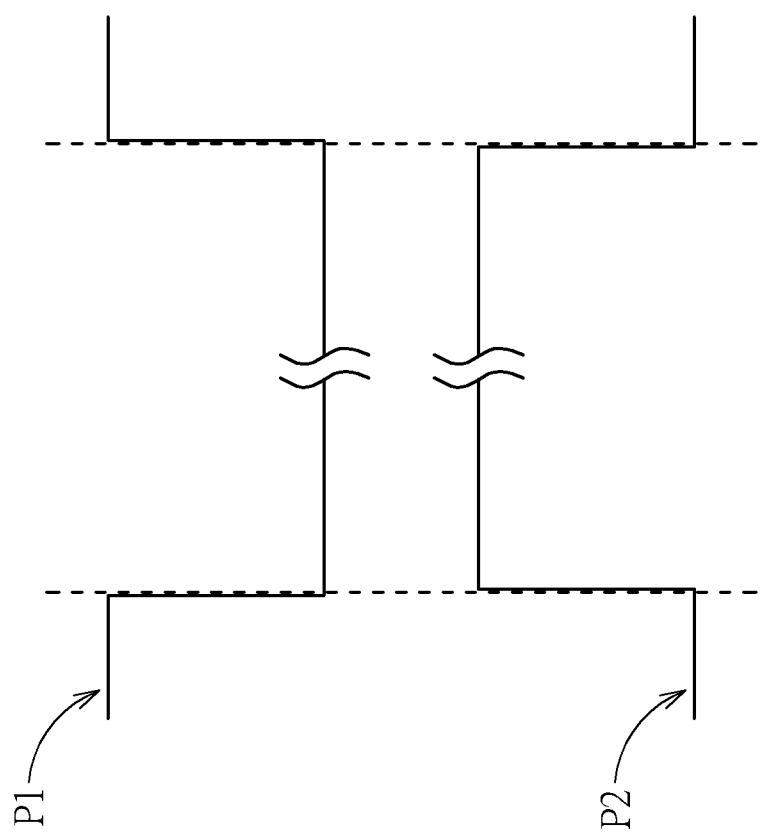
FIG. 6 is a diagram illustrating some non-overlapping edges of some control signals according to an embodiment of the present invention.

FIG. 6 is a diagram illustrating some non-overlapping edges of the control signals P1 and P2 according to an embodiment of the present invention. As shown in FIG. 6, the control signal P2 may change from a low voltage level into a high voltage level at a time point after the control signal P1 changes from the high voltage level into the low voltage level; and the control signal P1 may change from the low voltage level into the high voltage level at a time point after the control signal P2 changes from the high voltage level into the low voltage level. A non-overlapping signal generator may be configured to generate the control signals P1 and P2. Those skilled in the art should understand detailed implementation of the non-overlapping signal generator by referring to the above embodiments, and related description is therefore omitted for brevity For a purpose of an optimal performance, a frequency (which is referred to as an operating frequency) of each of the first control signal such as the control signal P1 and the second control signal such as the control signal P2 may be equal to the resonant frequency corresponding to the resonant tank 121/122. For example, after an inductance of the inductor L1 (or L2) and the capacitance of the capacitor C1 (or C2) are determined, the operating frequency may be set according to this inductance and this capacitance.

Based on the architecture shown in FIG. 2, a voltage (e.g. an average voltage) across the capacitor C3 may be 0.5 times the input voltage VIN, and a voltage (e.g. an average voltage) across each of the capacitor C1 and C2 is 0.25 times the input voltage. For example, when the input voltage VIN is 48 Volt (V), the average voltage across the capacitor C3 may be 24 V, the average voltage across each of the capacitor C1 and C2 is 12 V, and the output voltage VOUT (e.g. an average of the output voltage VOUT across the output capacitor COUT) may be 12 V.

Figure 7:
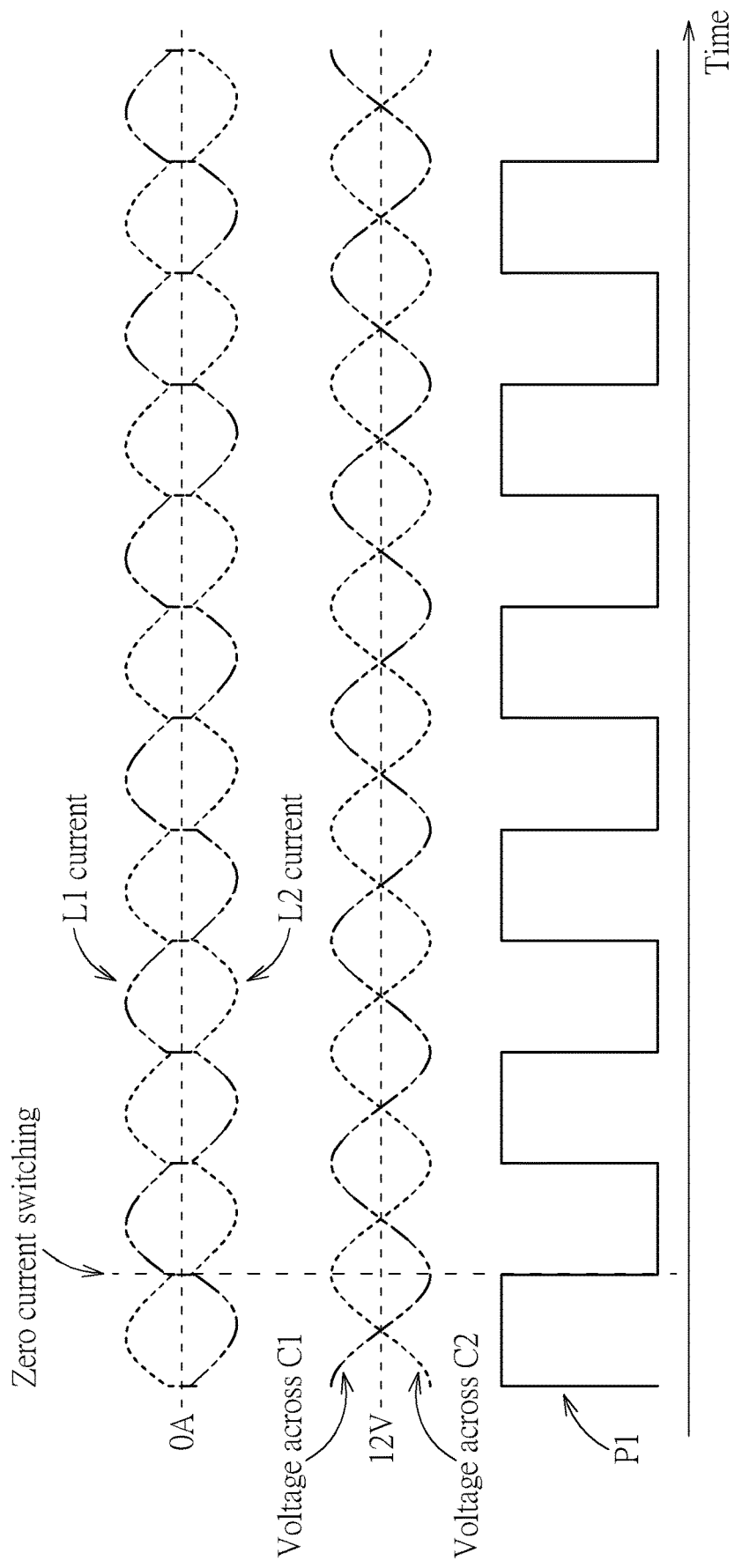
FIG. 7 is a diagram illustrating associated signals of the resonant switched-capacitor converter shown in FIG. 5 according to an embodiment of the present invention.

FIG. 7 is a diagram illustrating associated signals of the resonant switched-capacitor converter 10 shown in FIG. 5 according to an embodiment of the present invention, where it is assumed that C3=COUT=100 microfarad (uF), C1=C2=10 uF, and L1=L2=10 nanohenry (nH). Under a condition where the operating frequency is equal to the resonant frequency (e.g. 600 kHz) corresponding to the resonant tank 121/122, each of the controls signals P1 and P2 (the control signal P2 is not shown in FIG. 7 for brevity) toggles around time points of the resonant inductor (e.g. the inductors L1 and L2) having a zero current (e.g. 0 ampere (A)) as shown in FIG. 7, without any overlap between the respective high voltage levels of the control signals P1 and P2. For example, when the resonant switched-capacitor convert 10 is powered on and the operating frequency is equal to the resonant frequency, the time points of the resonant inductor (e.g. the inductors L1 and L2) having the zero current may gradually follow up transitions of the control signals P1 and P2, and finally become synchronous with the transitions of the control signals P1 and P2. In addition, the average voltage across each of the capacitor C1 and C2 is 12 V as shown in FIG. 7.

In some variations, the connection control circuit 160 may be modified, e.g. may be implemented by eight switches rather than by ten switches. Regarding the architecture with eight switches, the first terminal of the resonant tank 121 and the first terminal of the resonant tank 122 may be coupled to a same node, where this node may be coupled to the output terminal OUT during the first phase and coupled to the reference terminal during the second phase, e.g. share a same set of switches for controlling connections. Regarding the architecture with ten switches shown in FIG. 2, the first terminal of the resonant tank 121 and the first terminal of the resonant tank 122 may be separated and controlled by different sets of switches; for example, the switches SW1 and SW2 are configured to control connection of the first terminal of the resonant tank 121, and the switches SW3 and SW4 are configured to control connection of the first terminal of the resonant tank 122.

Figure 8:
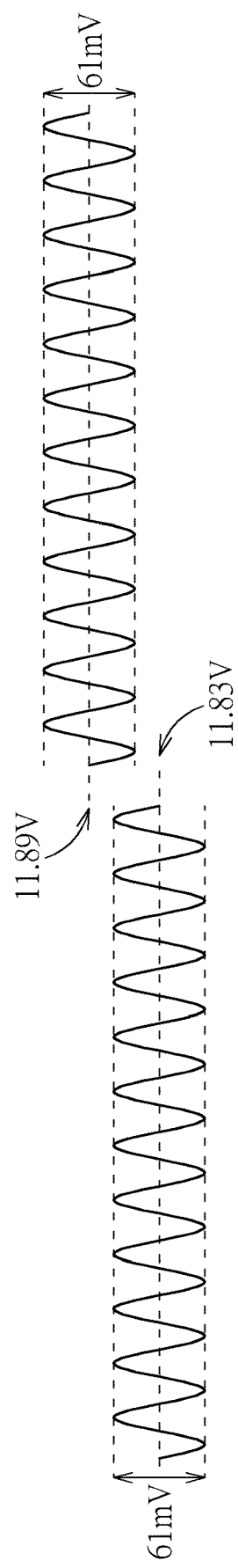
FIG. 8 is a diagram illustrating associated signals of different architectures according to an embodiment of the present invention.

FIG. 8 is a diagram illustrating associated signals of the architecture with eight switches and the architecture with ten switches according to an embodiment of the present invention, where a left-half portion of FIG. 8 shows the signal of the architecture with eight switches, and a right-half portion of FIG. 8 shows the signal of the architecture with ten switches. In comparison with the architecture with eight switches, as the architecture with ten switches employs two more switches, an overall effective turn-on resistance of the architecture with ten switches can be reduced, and an overall efficiency can be therefore improved. As shown in FIG. 8, the architecture with eight switches obtains an 11.83 V average voltage (which means a 170 millivolt (mV) dropout voltage is introduced) with a 61 mV ripple, and the architecture with ten switches obtains an 11.89 V average voltage (which means a 110 mV dropout voltage is introduced) with a 61 mV ripple.

To summarize, the embodiments of the present invention provide a resonant switched-capacitor converter without using any transformer. In addition, the embodiments of the present invention provide novel architecture (e.g. the architecture with ten switches) of the resonant switched-capacitor converter to achieve an optimal performance (e.g. a dropout voltage and/or power efficiency). Thus, the present invention can improve the overall performance without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resonant switched-capacitor converter, configured to convert an input voltage on an input terminal of the resonant switched-capacitor converter into an output voltage on an output terminal of the resonant switched-capacitor converter, wherein the resonant switched-capacitor converter comprises:
   a first resonant tank;
   a second resonant tank;
   at least one non-resonant capacitor; and
   a connection control circuit, coupled to the input terminal, the output terminal, the first resonant tank, the second resonant tank and the at least one non-resonant capacitor, configured to control connections of the first resonant tank, the second resonant tank and the at least one non-resonant capacitor;
   wherein during a first phase, a first terminal of the first resonant tank is coupled to a reference terminal via a path without any capacitor, and a first terminal of the second resonant tank is coupled to the output terminal; and during a second phase, the first terminal of the first resonant tank is coupled to the output terminal, and the first terminal of the second resonant tank is coupled to the reference terminal via a path without any capacitor.

2. The resonant switched-capacitor converter of claim 1, wherein during the first phase, a second terminal of the first resonant tank is coupled to the output terminal, and a second terminal of the second resonant tank is coupled to a first terminal of the non-resonant capacitor; and during the second phase, the second terminal of the first resonant tank is coupled to a second terminal of the non-resonant capacitor, and the second terminal of the second resonant tank is coupled to the output terminal.

3. The resonant switched-capacitor converter of claim 1, wherein during the first phase, a first terminal of the non-resonant capacitor is coupled to a second terminal of the second resonant tank, and a second terminal of the non-resonant capacitor is coupled to the input terminal; and during the second phase, the first terminal of the non-resonant capacitor is coupled to the reference terminal, and the second terminal of the non-resonant capacitor is coupled to a second terminal of the first resonant tank.

4. The resonant switched-capacitor converter of claim 1, wherein a voltage across the non-resonant capacitor is 0.5 times the input voltage.

5. The resonant switched-capacitor converter of claim 1, wherein the connection control circuit comprises a plurality of switches, a portion of the switches are controlled by a first control signal, and another portion of the switches are controlled by a second control signal.

6. The resonant switched-capacitor converter of claim 5, wherein the first control signal and the second control signal are non-overlapping control signals; and one of the first control signal and the second control signal has a fifty percent or less duty cycle, and another of the first control signal and the second control signal has a duty cycle less than fifty percent.

7. The resonant switched-capacitor converter of claim 5, wherein a frequency of each of the first control signal and the second control signal is equal to a resonant frequency corresponding to the first resonant tank and the second resonant tank.

8. The resonant switched-capacitor converter of claim 1, wherein each resonant tank of the first resonant tank and the second resonant tank comprises a resonant inductor and a resonant capacitor, and a resonant frequency corresponding to the each resonant tank is determined by the resonant inductor and the resonant capacitor.

9. The resonant switched-capacitor converter of claim 8, wherein a voltage across the resonant capacitor is 0.25 times the input voltage.

10. A resonant switched-capacitor converter, configured to convert an input voltage on an input terminal of the resonant switched-capacitor converter into an output voltage on an output terminal of the resonant switched-capacitor converter, wherein the resonant switched-capacitor converter comprises:
   a first resonant tank;
   a second resonant tank;
   at least one non-resonant capacitor; and
   a connection control circuit, coupled to the input terminal, the output terminal, the first resonant tank, the second resonant tank and the at least one non-resonant capacitor, configured to control connections of the first resonant tank, the second resonant tank and the at least one non-resonant capacitor;
   wherein the connection control circuit comprises:
      a first switch, directly connected between a first terminal of the non-resonant capacitor and a second terminal of the second resonant tank; and
      a second switch, directly connected between a second terminal of the non-resonant capacitor and a second terminal of the first resonant tank, wherein the first terminal of the non-resonant capacitor is different from the second terminal of the non-resonant capacitor;
   wherein during a first phase, the first terminal of the non-resonant capacitor is coupled to the second terminal of the second resonant tank via the first switch; and during a second phase, the second terminal of the non-resonant capacitor is coupled to the second terminal of the first resonant tank via the second switch.

11. The resonant switched-capacitor converter of claim 10, wherein during the first phase, the second terminal of the first resonant tank is coupled to the output terminal; and during the second phase, the second terminal of the second resonant tank is coupled to the output terminal.

12. The resonant switched-capacitor converter of claim 10, wherein during the first phase, the second terminal of the non-resonant capacitor is coupled to the input terminal; and during the second phase, the first terminal of the non-resonant capacitor is coupled to a reference terminal.

13. The resonant switched-capacitor converter of claim 10, wherein a voltage across the non-resonant capacitor is 0.5 times the input voltage.

14. The resonant switched-capacitor converter of claim 10, wherein the connection control circuit comprises a plurality of switches, a portion of the switches are controlled by a first control signal, and another portion of the switches are controlled by a second control signal.

15. The resonant switched-capacitor converter of claim 14, wherein the first control signal and the second control signal are non-overlapping control signals; and one of the first control signal and the second control signal has a fifty percent or less duty cycle, and another of the first control signal and the second control signal has a duty cycle less than fifty percent.

16. The resonant switched-capacitor converter of claim 14, wherein a frequency of each of the first control signal and the second control signal is equal to a resonant frequency corresponding to the first resonant tank and the second resonant tank.

17. The resonant switched-capacitor converter of claim 10, wherein each resonant tank of the first resonant tank and the second resonant tank comprises a resonant inductor and a resonant capacitor, and a resonant frequency corresponding to the each resonant tank is determined by the resonant inductor and the resonant capacitor.

18. The resonant switched-capacitor converter of claim 17, wherein a voltage across the resonant capacitor is 0.25 times the input voltage.

* * * * *